United States Patent [19]

Burmeister

[11] Patent Number: 4,748,901
[45] Date of Patent: Jun. 7, 1988

[54] COFFEEMAKER

[75] Inventor: Dennis N. Burmeister, Libertyville, Ill.

[73] Assignee: Sunbeam Corporation, Downers Grove, Ill.

[21] Appl. No.: 922,379

[22] Filed: Oct. 23, 1986

[51] Int. Cl.⁴ ............................................. A47J 31/02
[52] U.S. Cl. ........................................ 99/306; 99/295
[58] Field of Search ................. 99/306, 295, 279, 280, 99/281, 282, 283, 288, 290, 300, 302 R, 304, 307, 313, 314, 315; 426/433

[56] References Cited

U.S. PATENT DOCUMENTS

| | | | |
|---|---|---|---|
| 4,138,936 | 2/1979 | Williams | 99/306 |
| 4,328,740 | 5/1982 | McDonough | 99/305 |
| 4,331,067 | 5/1982 | Mysicka | 99/295 |

Primary Examiner—Robert W. Jenkins
Attorney, Agent, or Firm—Neil M. Rose

[57] ABSTRACT

An automatic electric coffeemaker having a housing including a molded housing member which includes an integral reservoir and passageway conducting the heated water to the water dispensing portion of the housing. The housing is adapted to support an assembly including a carafe, a coffee basket and spreader plate below a hot water dispensing head. The housing has a flexible skirt which surrounds the water dispensing head and engages the spreader plate to enclose vapors generated in the coffeemaker and a passageway is provided in the molded member to carry the vapors from within the skirt to the portion of the housing above the reservoir.

22 Claims, 8 Drawing Sheets

COFFEEMAKER

BACKGROUND OF THE INVENTION

This invention relates generally to electric coffeemakers, and more specifically to domestic electric coffeemakers in which a volume of water is heated in small increments and dripped through a spreader plate into a coffee grounds containing basket where the coffee brews and passes downwardly into a coffee carafe. These types of domestic coffeemakers are generally referred to as drip type coffeemakers.

In the last decade, the drip type coffeemaker has become the most popular type of coffeemaker in the U.S. market, largely displacing the vacuum type and percolator type coffeemakers which had theretofore been popular. Characteristically, the drip coffeemaker includes some type of easily filled reservoir which is connected by a conduit to water heating means with the discharge of the water heating means being connected to some sort of dispensing head which dispenses the heated water to a grounds containing brew basket. The dispensing head or the basket normally contains some sort of means to distribute the water across the bed of grounds, the means often being in the form of a spreader plate having apertures distributed above the coffee grounds. The water is normally fed by gravity to the heating means which then serves as a pump to raise the heated water upwardly, again to the level of the reservoir where it enters the water dispensing head. A check valve between the reservoir and the heating means allows the heating means to create steam or vapor which propels the heated water in the direction of the dispensing head.

It is conventional to associate the heating means in a hot plate type of structure on which the carafe for receiving the coffee liquor is positioned. Thus, the heating means serves to heat the water used for brewing the coffee and also to keep the brewed coffee warm. This basic type of drip coffeemaker has been well known in the art for several decades, and most of the development work during the intervening years has been directed toward improving the reliability and reducing the cost of manufacture of such coffeemakers.

Examples of prior art directed to drip type coffeemakers are the patents to Tarrant, et al. U.S. Pat. Nos. 3,589,271; Hollingsworth 4,083,295; Kyles 4,303,827; Flaherty, Jr., et al. 4,356,381; McLean 4,414,884; Marotta 4,402,257; and Amiot 4,467,707.

There are variations in the form taken by the drip coffeemakers now on the market insofar as the location of the coffee ground basket with respect to the carafe is concerned. As shown in the above-cited Flaherty, Jr., et al. U.S. Pat. No. 4,356,381, the coffee ground basket may be supported on the carafe for receiving the coffee liquor or, as in the case of the McLean U.S. Pat. No. 4,414,884 and Marotta U.S. Pat. No. 4,402,257, the coffee basket may be supported on the coffeemaker housing independent of the carafe. In either case, there have been concerns over containing within the system the vapors generated in connection with the heating of the water and the coffeemaking process in general. These vapors can damage the cabinetry above the coffeemaker and are thought to be useful to the flavor of the brew if they are retained in the system. The problem of retaining these vapors in the system has become of increased importance as a consequence of the popularity of coffeemakers which are adapted to be mounted in depending fashion immediately below the bottom of a kitchen cabinet. Co-pending application Ser. No. 722,941, filed Apr. 12, 1985, and assigned to the same assignee of the instant invention, discloses and claims an under-the-cabinet coffeemaker which includes means to seal the system and prevent the discharge of vapors generated in the system.

It has been commonplace to use plastic molded parts in connection with the drip type coffeemaker as illustrated in most of the above-cited patents. Most of the problems involved in drip type coffeemakers involve the water connections which are involved in the conduits transferring the water from the reservoir to the heating means and thence to the hot water dispensing head. Any simplification in the number and arrangement of these water conduits tends to substantially reduce the manufacturing cost of the coffeemaker and also to reduce the likelihood of malfunctions occurring.

SUMMARY OF THE INVENTION

In accordance with the present invention there is provided an automatic drip type coffeemaker having a housing including a molded housing member formed to include an integral reservoir and passageways for conducting the heated water to the dispensing portion of the housing. The coffeemaker is of the type in which the housing is of a somewhat C-shape with a pedestal portion on which the carafe for the brewed coffee is received, a column portion extending from the pedestal portion and a head portion within which the water receiving reservoir and the controls for the coffeemaker are disposed. The heating means for the water is disposed in the pedestal so that it may serve the dual function of heating the water for brewing the coffee and at the same time keeping the brewed coffee in the carafe warm. The head portion of the housing comprises a one piece molded plastic member with a cover cooperating with the plastic member to form two separate compartments, one of which contains the controls and the electrical connections, while the other contains the reservoir and the passageway for delivering the heated water to the dispensing head.

The head portion of the housing is provided with a flexible skirt surrounding the water dispensing head and extending downwardly with the bottom edge of the skirt engaging the spreader plate on the coffee basket. The skirt extends into a depression on the spreader plate and encloses all of the apertures in the top of the spreader plate, thereby trapping the vapors associated with the coffee brewing process. A second passageway formed integrally with the molded plastic member permits the water vapor to be conducted back into the head portion of the housing to the area above the water reservoir. The flexible skirt provides an improved seal and creates little obstruction to the insertion and removal of the coffee carafe with its associated basket and spreader plate.

Accordingly, it is an object of the present invention to provide an improved low cost drip type coffeemaker having means for trapping and recycling vapors associated with the coffee brewing process.

It is another object of the present invention to provide a drip type coffeemaker having a flexible skirt surrounding the water dispensing head and engaging the spreader plate of the brew basket so as to entrap vapors associated with the coffee brewing process.

It is another object of the present invention to provide an improved seal between a coffeemaker housing and the removable carafe and brew basket which combines with integrally formed passageways to conduct the vapors associated with the coffee brewing process back to the water reservoir within the housing.

It is a further object of the present invention to provide an improved low cost drip type coffeemaker having a plastic molded housing portion in which the reservoir and water distribution passageways are molded integrally therewith.

Further objects and advantages will become apparent as the following description proceeds, and the features of novelty which characterize the invention will be pointed out in the claims annexed to and forming a part of the specification.

Figure 1:
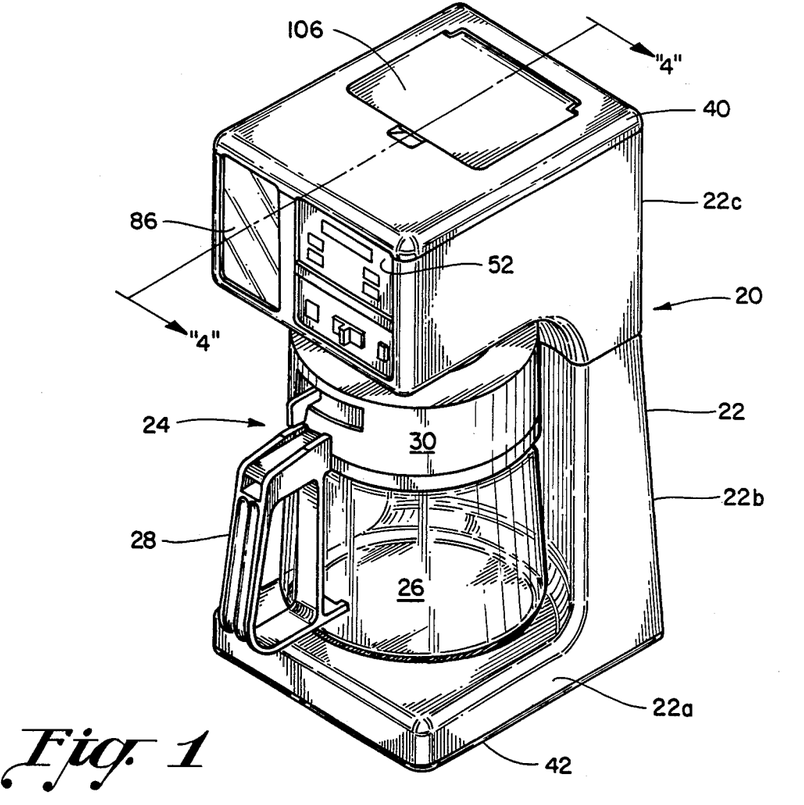
FIG. 1 is a perspective view of a drip coffeemaker embodying our invention.
Figure 2:
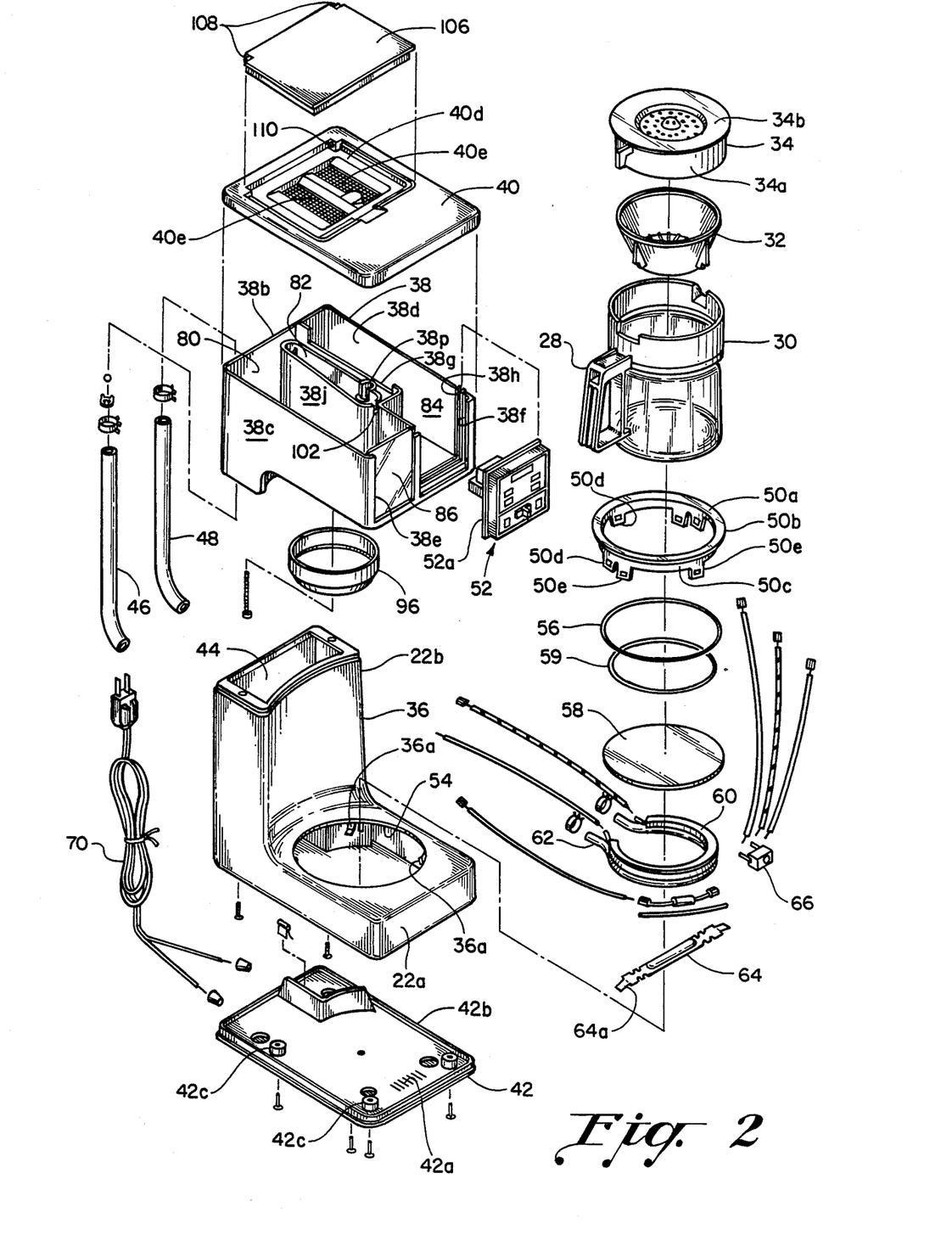
FIG. 2 is an exploded perspective view of the coffeemaker of FIG. 1 showing the parts in their disassembled position.
Figure 4:
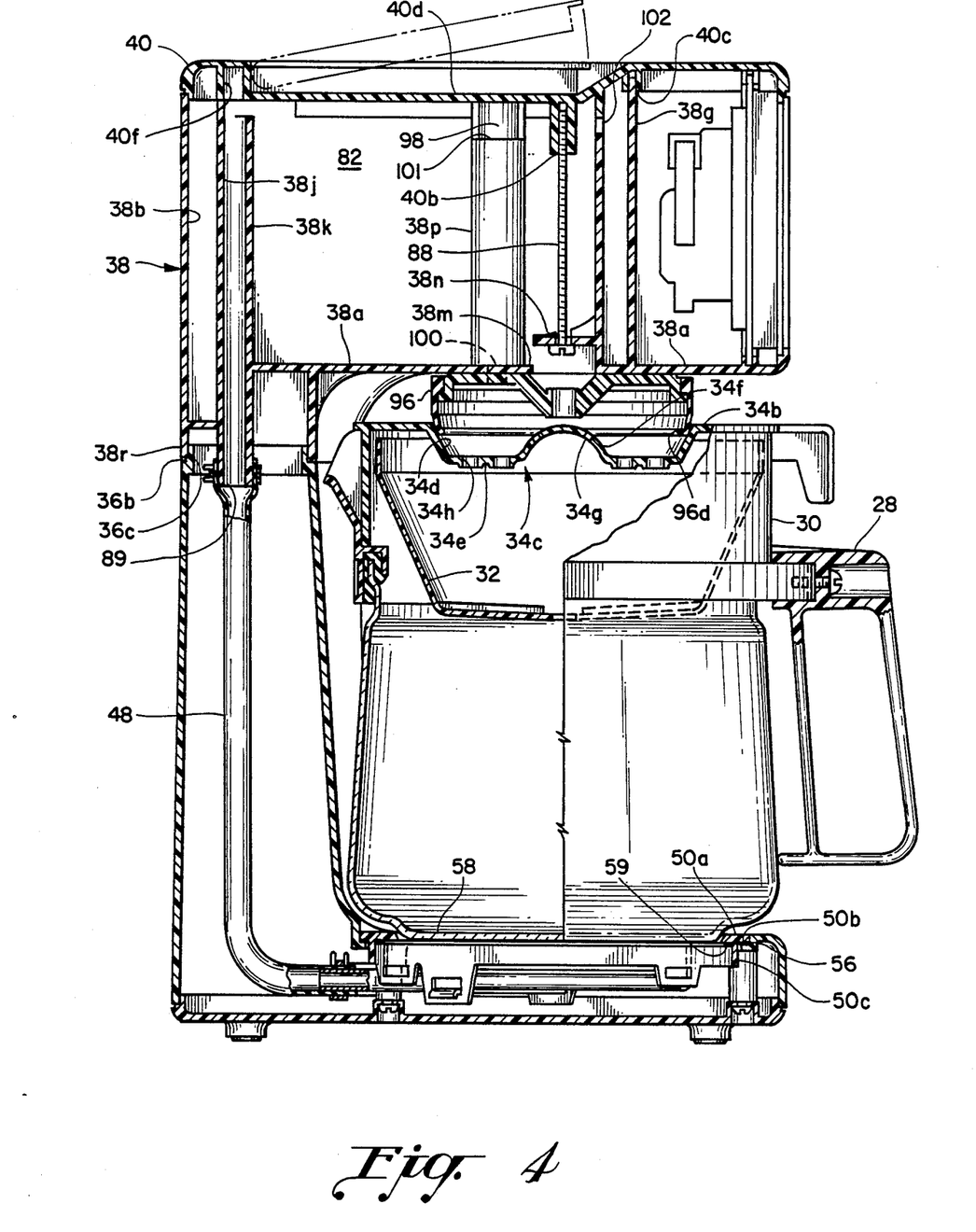
FIG. 4 is a vertical sectional view of the coffeemaker of FIG. 1 taken substantially on line 4—4 of FIG. 1.

Referring now to the drawings, there is shown in FIG. 1 a domestic electric drip type coffeemaker designated generally by reference numeral 20 embodying my invention. The coffeemaker 20 includes a housing designated generally by reference numeral 22 which has a pedestal portion 22a, a column portion 22b and a head portion 22c. The coffeemaker 20 further includes a carafe and basket assembly 24 including a coffee carafe 26 having a handle 28 and a basket supporting rim 30. As is best shown in FIGS. 2 and 4, the rim 30 supports a basket 32 and a spreader member 34 which includes a peripheral flange 34a and a spreader plate 34b. The spreader plate 34b has a depressed central portion 34c, the periphery of which is defined by a funnel shaped portion 34d which surrounds an annular apertured portion 34e which in turn surrounds a central raised portion 34f having openings 34g designed to permit the outward flow of vapor from within the basket 32. The annular portion 34e is formed with a plurality of apertures 34h. It should be understood that the carafe assembly 24, including the rim 30, the basket 32 and the spreader member 34, form no part of the present invention and are substantially the same as the corresponding structure disclosed in co-pending application Ser. No. 722,941, filed Apr. 12, 1985, and assigned to the same assignee as the instant application.

As shown in FIG. 2, the housing 22 is made up of several major molded plastic parts, including a pedestal and column member 36 and a head member 38 which, together with a cover 40 and a base 42, define the complete housing 22. The pedestal and column member 36 defines the column portion 22b and the pedestal portion 22a. The column portion 22b includes a vertical passageway 44 through which the two water conduits 46 and 48 extend between a heater assembly 50 and the head portion 22c of the coffeemaker. Also extending upwardly through the column portion 22b in the passageway 44 are the electrical connections to a control module 52 mounted in the head portion 22c.

Figure 9:
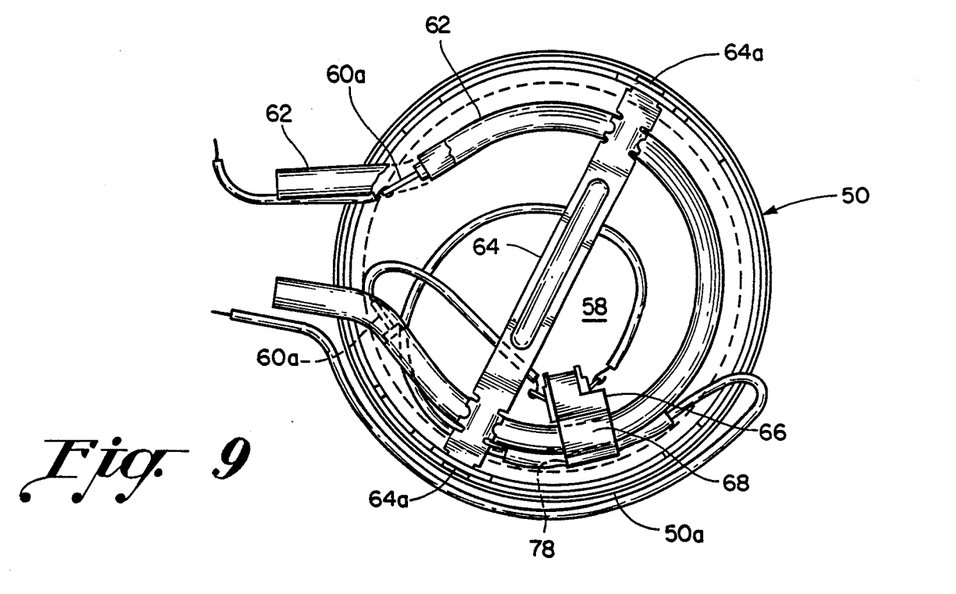
FIG. 9 is a bottom plan view of the heating means and warming assembly of the coffeemaker of FIG. 1.
Figure 10:
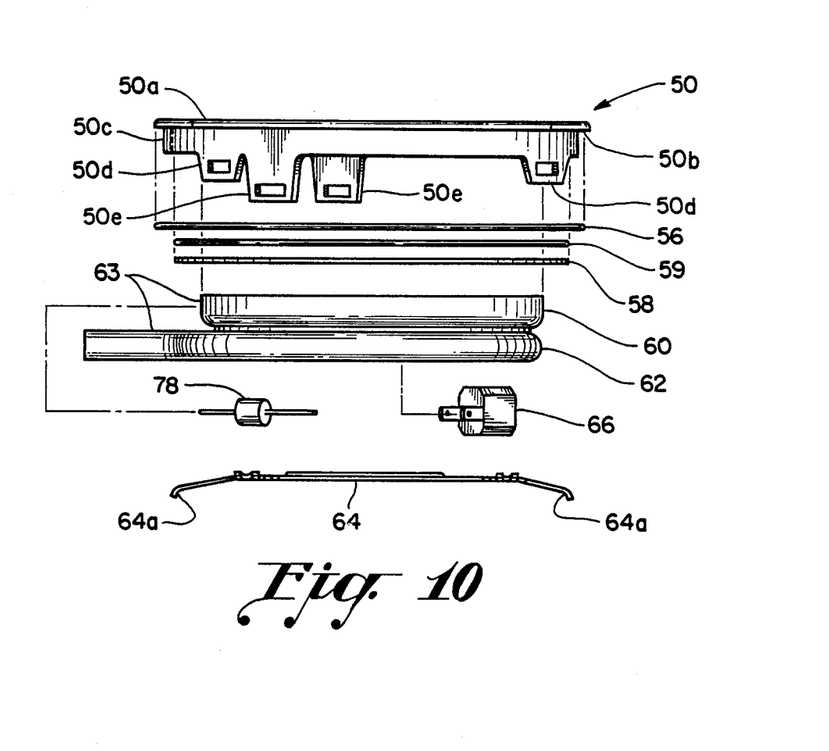
FIG. 10 is an exploded view of the parts of the assembly of FIG. 9.
Figure 11:
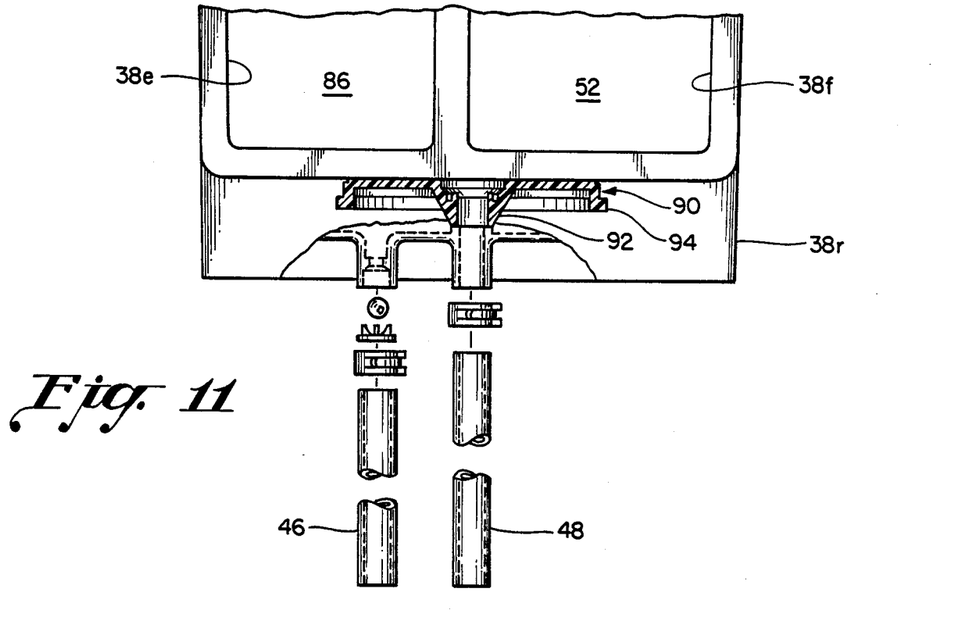
FIG. 11 is an enlarged front elevational view of a portion of the housing showing the water connections to the head portion of the housing in an exploded view.

The member 36 is formed in the pedestal portion 22a with an enlarged opening 54 into which the heater assembly 50 is received. The assembly 50 is best shown in FIGS. 9 and 10. As shown in FIG. 10, the heater assembly includes a phenolic ring 50a which has an annular rim 50b which rests in a shoulder formed in the opening 54 as best shown in FIG. 4. Inwardly of the rim 50b is a skirt 50c which extends through the opening 54 and includes two pairs of short assembly lugs 50d and one pair of long assembly lugs 50e. The heater assembly 50 is engaged by a silicon O-ring 56 which is clamped between the rim 50b and the shouldered portion of the opening 54. Mounted within the ring 50a is an aluminum disc or plate 58 which supports the carafe 26 and provides good heat transfer from a heating element 60 which is integrally formed with a water tube 62. A second O-ring gasket 59 is positioned between the upper surface of the disc 58 and the under-surface of the ring 50 inside of the skirt 50 providing a seal between the ring 50 and the disc 58. The heating element 60 and the water tube 62 utilize a single aluminum extrusion 63 which is bent in the form of a loop, as best shown in FIG. 9, so that the heater 60 and water tube 62 conform generally to the circular contour of plate 58. The water tube 62 has its ends extending outwardly from beneath the plate 58, as shown in FIG. 9, to facilitate connection with the water conduits 46 and 48. The heater 60 is pressed upwardly against the plate 58 to obtain a good heat transfer relationship. The heating element 60 has terminal portions 60a and is a conventional sheathed heating element having a coiled resistance element supported within a tubular passageway in the extrusion 63 by means of magnesium oxide powder which supports the coiled element in electrical isolation from the support tube.

Figure 3:
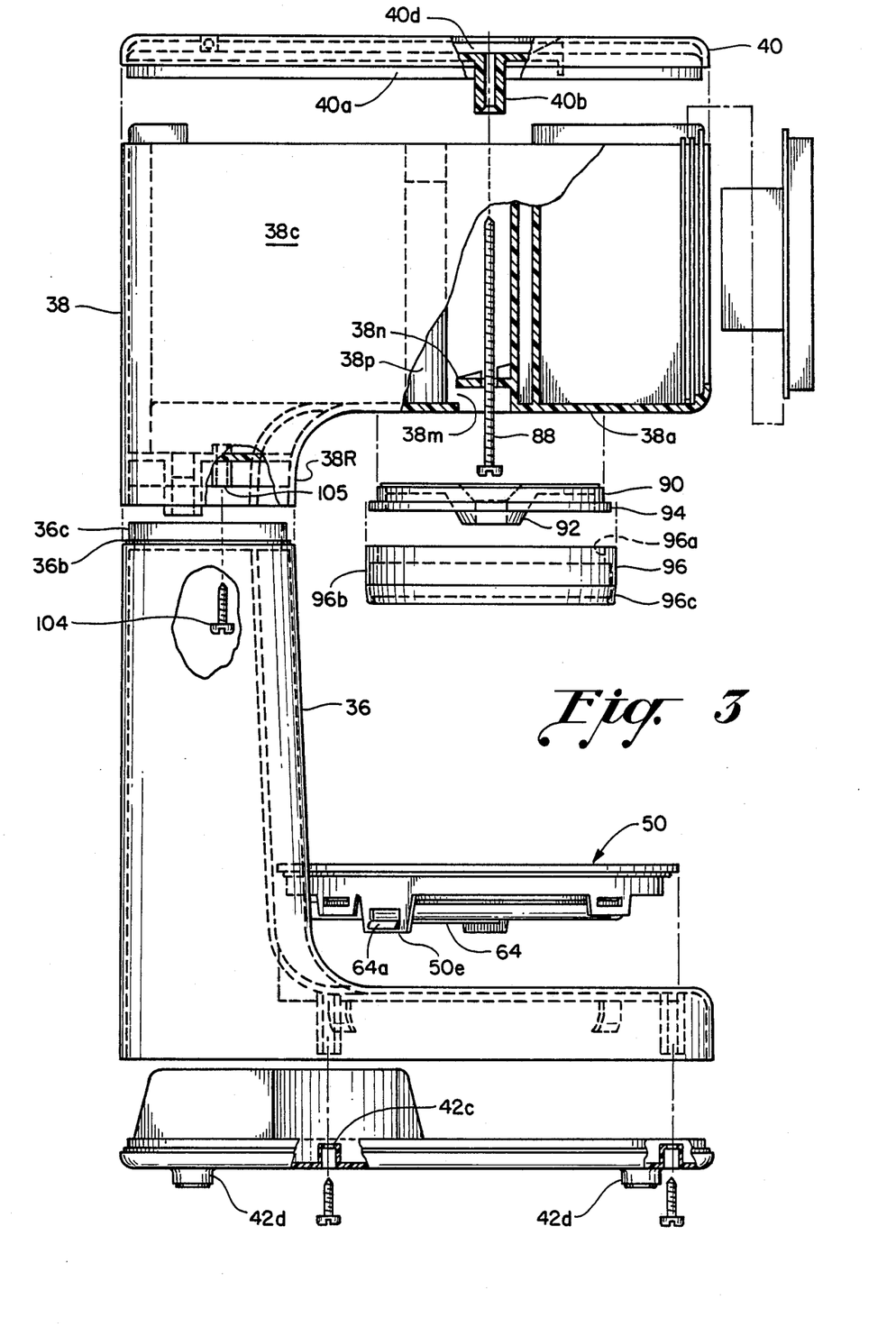
FIG. 3 is a side elevational view of the coffeemaker of FIG. 1, shown with the major assemblies disassembled for clarity and with some of the housing portions cut away to expose the assembly means.

In order to secure the heating element 60 in intimate engagement with the plate 58 and the plate 58 assembled to the ring 50, a flexible metal bracket 64 is disposed diametrically across the plate 58 in engagement with the water tube 62 with the turned up ends 64a extending through the openings in the lugs 50e as best shown in FIGS. 3 and 9. The lugs 50e and the bracket 64 are formed and dimensioned so that the bracket is flexed and under tension to apply a biasing force urging the heater 60 against the plate 58 and the plate 58 against the ring 50. For the purpose of preventing overheating of the heater assembly 50, there is provided a thermostat 66 which is secured to the heating element 60 and the water tube 62 by a resilient clamp 68, as shown in FIG.

9. The clamp 68 also serves to secure the fuse 78 against the outer surface of the extrusion 63 which forms the heater 60 and the water tube 62.

The member 36 adjacent to the opening 54 is provided with four downwardly and inwardly extending integrally molded projections 36a which engage the lugs 50d formed on the heater assembly ring 50a. The tips of these projections 36a snap into the openings in the lugs 50d and restrain the assembly 50 from upward movement with respect to the housing 22. When the projections 36a are engaged with the lugs 50d, the ring 50 is positioned with respect to member 36 so that the O-ring gasket 56 is compressed between the rim 50b and the adjacent shoulder on the member 36 to provide a seal which prevents leakage of accidentally spilled coffee or water into the pedestal portion 22a of the housing.

Figure 13:
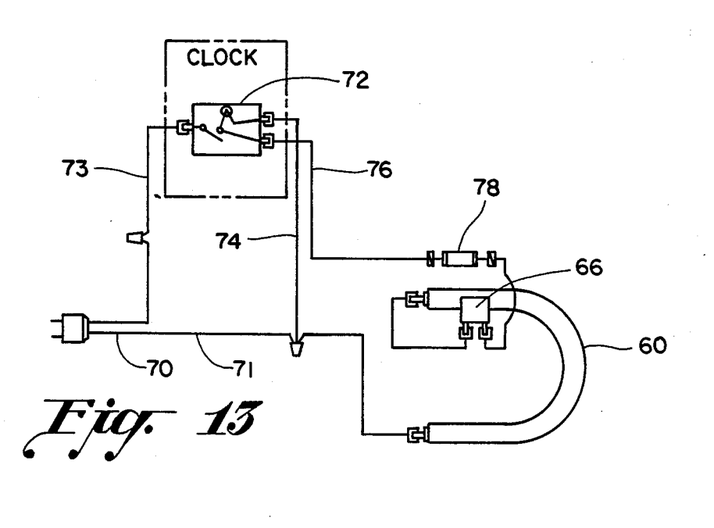
FIG. 13 is a schematic wiring diagram of the coffeemaker of FIG. 1.

In order to supply power to the coffeemaker 20, a suitable power cord 70 is provided which is connected to the housing 22 through the base 42 with one lead 71 of the cord 70 being connected directly to a terminal of the heater 60 as shown in FIG. 13 and the other lead 73 being connected to a switch terminal which is part of a clock timer 72 in the control module 52 referred to above. As is conventional, there is also a lead 74 extending to the clock timer 72 so that the clock portion of the clock timer 72 is connected directly across the line and is in parallel with the switch and the heating element 60 as is conventional. A lead 76 extends from the switch in the clock timer to the other terminal of the heater 60 through the thermostat 66 and a fuse 78, the circuit being entirely conventional in all respects for a coffeemaker of this type.

Figure 7:
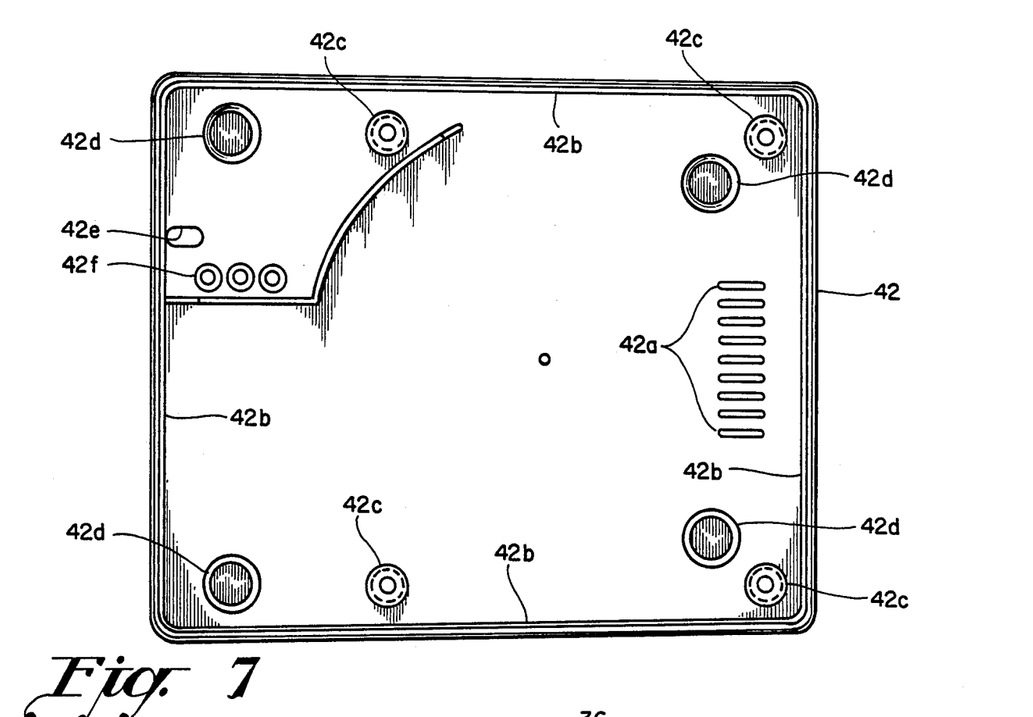
FIG. 7 is a top plan view of the base of the coffeemaker of FIG. 1.

As shown in FIGS. 2, 3 and 7, the base 42 is generally flat, having air circulation slots 42a and a small peripherally extending wall 42b which extends upwardly into the bottom of the member 36 to retain the base 42 in proper juxaposition therewith. Bosses 42c receive assembly screws which extend upwardly into threaded engagement with corresponding bosses in the member 36. Integrally formed bosses 42d extend downwardly from the base 42 and provide supporting feet for the coffeemaker 20.

As shown in FIG. 7, the base 42 includes an opening 42e through which the power cord 70 enters the housing 22. Adjacent the opening 42e are three integrally formed posts 42f around which the cord 70 is wrapped to provide a strain relief in a conventional manner.

Figure 5:
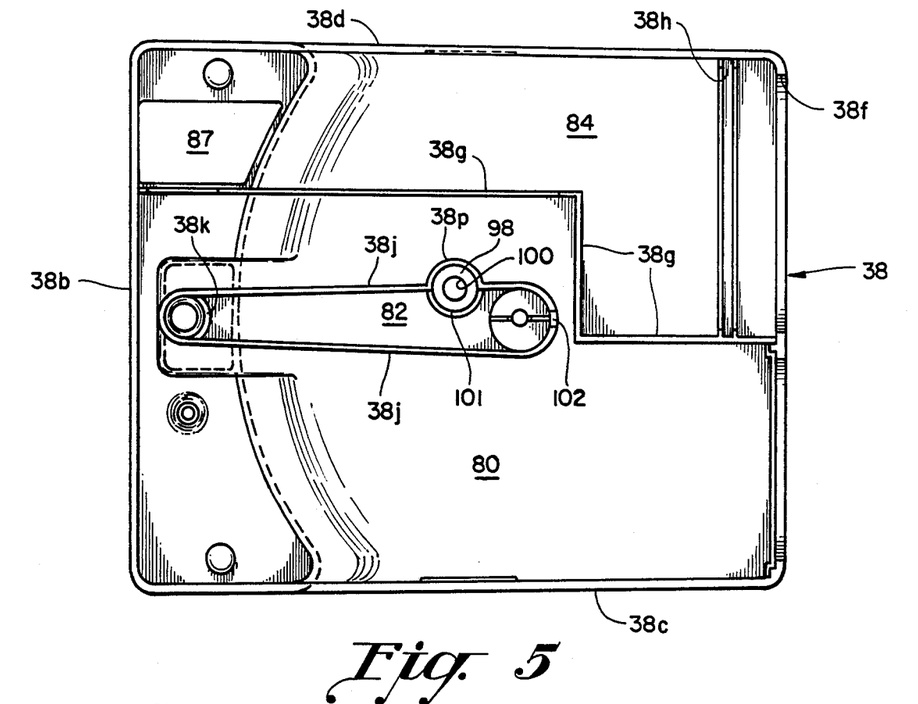
FIG. 5 is a top plan view of the head portion of the housing of the coffeemaker of FIG. 1.

Mounted at the top of the pedestal portion 22b is the head member 38 which is a one-piece molded plastic member having walls which define a water reservoir 80, a water trough 82, and a control compartment 84, as are best shown in FIGS. 2 and 5. The head member 38 consists of a bottom wall 38a, a rear wall 38b and side walls 38c and 38d. The front of the head member 38 is formed with openings 38e and 38f which are closed respectively by a transparent window 86 and the control module 52. The transparent window 86 forms the front wall of the reservoir 80 and is provided with suitable indicia to inform the user of the amount of water which has been poured into the reservoir. The transparent window 86 is a plastic member which is ultrasonically bonded around its side and bottom edges to the portions of the member 38 defining the opening 38e so as to provide a watertight closure for the opening 38e.

As is best shown in FIGS. 2 and 5, the interior volume of the head member 38 is divided by an irregular wall 38g which extends vertically from the bottom wall 38a to the level of the side walls 38c and 38d and the rear wall 38b. The wall 38g has stepped elevated portions at the front and rear which cooperate with the cover 40 as will be explained in greater detail below. The wall 38g separates the water containing reservoir 80 from the compartment 84 into which the electrical connections extend from the pedestal and column portions 22a and 22b upwardly into the head portion 22c for connection to the control module 52 which includes the clock 72. In the rear, bottom corner of the compartment 84, the member 38 is formed with an opening 87, as shown in FIG. 5, through which the leads 73, 74 and 76 extend downwardly through the passageway 44 in member 36 for connection to the power cord 70 and the heater 60. Thus, the electrical portions of the coffeemaker are thus separated from the water containing portions by the wall 38g.

The control module 52 has a peripheral flange 52a which is received within the integrally formed grooves 38h to support the switch module 52 with its face flush with the front edge of the head member 38.

The trough 82, shown best in FIGS. 2 and 5, is a compartment which is formed within the reservoir 80 by vertical walls 38j which form an elongated cavity or trough. At the rearward end of the trough 82, there is provided a wall or dam 38k extending across the trough and projecting upwardly from the bottom to a point spaced below the top of the walls 38j as best shown in section in FIG. 4. The bottom wall 38a within the area defined by the dam 38k and the walls 38j is formed with an inlet pipe 89 which connects to the trough 82 in the area behind the dam 38k as enclosed by the walls 38j. Thus, the water passing from the water tube 62 upwardly through the conduit 48 which is connected to pipe 89 enters the space behind the dam 38k and is forced upwardly over the top of the dam 38k where it flows along the bottom of the trough 82 to the front end of the trough where it exits through an opening 38m formed in a boss 38n through which an assembly screw 88 extends.

The dam 38k is sufficiently high that it is above the level that may exist in the reservoir 80 when it is initially filled by the user. It is necessary that the dam be present so that the water in the reservoir will not flow by gravity down through the conduit 46, around the water tube 62, up the conduit 48 and out through the passageway 82 without being properly heated. The passageway, including the dam 38k and the associated trough 82, provides an arrangement which has been molded integrally with the member 38 and provides the complete conduit for the water passing from the conduit 48 to the outlet from the head portion 22c.

Figure 12:
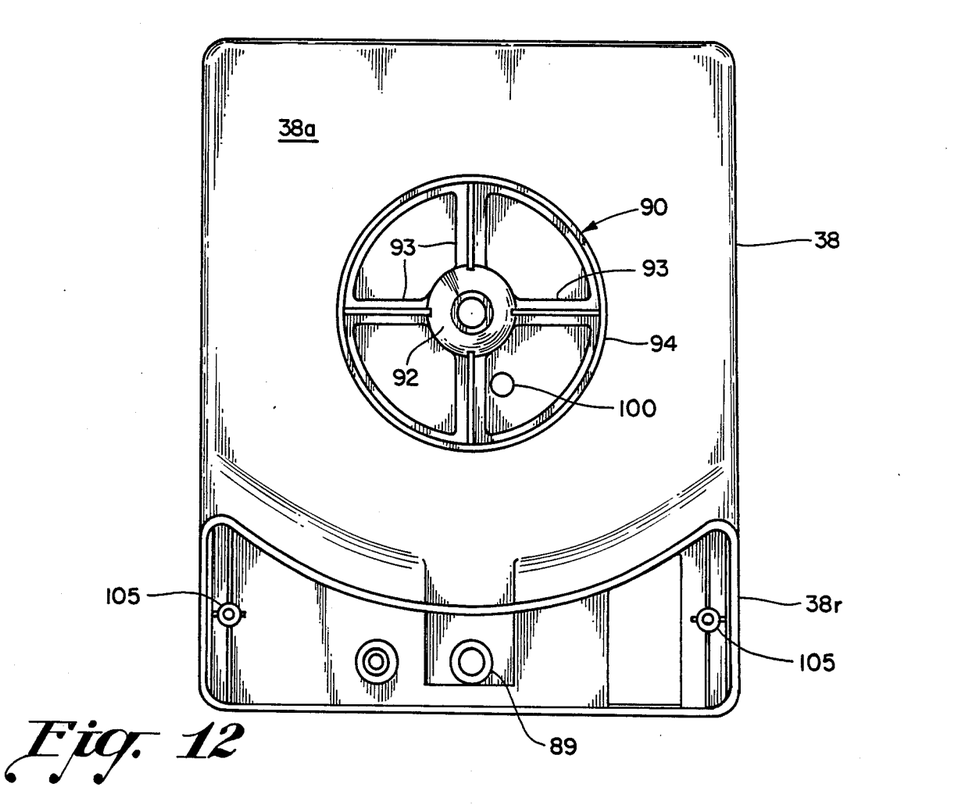
FIG. 12 is a bottom plan view of the head portion of the housing of the coffeemaker of FIG. 1.

Connected to the bottom wall 38a of the head member 38 is a dispenser ring 90 which has a central funnel-shaped dispensing portion 92 and a retaining flange 94. The portion 92 and the flange 94 are interconnected by spoke members 93, as shown in FIG. 12. The ring 90 is ultrasonically secured to the member 38 and provides a mounting means for a flexible skirt 96 which is made of silicon rubber. The skirt 96 has an inwardly extending rim or upper edge portion 96a which is resiliently applied over the ring 90 so that the flange 94 retains the skirt 96 in position depending from the bottom of the head portion 22c; as best shown in FIG. 4. The skirt 96 has a cylindrical portion 96b which ends in an inwardly tapered lower edge 96c which is of thin and very pliable silicon rubber material. At the lower edge of the skirt 96 there is an integral bead 96d as best shown in FIG. 4, which gives the skirt additional rigidity and urges it into sealing engagement with the funnel portion 34d on the spreader plate 34b. Thus, as the carafe assembly 24 with the rim 30 and the spreader member 34 is inserted onto the pedestal portion 22a in position on the plate 58, the skirt 96 deflects or distorts readily so that the assembly may move into a coaxial position with respect to the dispensing head 92 with the bottom edge of the skirt 96 extending into the depression in the spreader plate 34b with the bottom edge of the skirt in sealed engagement with the funnel portion 34d. This arrangement assures that the vapors generated in the coffeemaking process will not escape from the space between the spreader plate and the head portion 22c.

In order to permit the vapors to circulate from the space within the skirt 96 back into the head portion 22c, there is a vertically extending passageway 98 which is formed by the tubular walls 38p, as best shown in FIGS. 2, 4 and 5. The tubular passageway 98 terminates in an opening 100 in the bottom wall 38a, as shown in FIGS. 5 and 12. At the upper end of the wall 38p, the portion within the trough 82 is provided with a cut-out or opening 101 to allow the vapors passing upwardly through the passageway 98 to enter into the trough 82. There is also a cutout or opening 102 in the front of wall 38j which permits the vapors to pass from the trough 82 into the top of the reservoir 80. Thus, the vapors can condense either in the trough 82 or the reservoir 80, but still are retained within the water containing portion of the head member 38.

Figure 8:
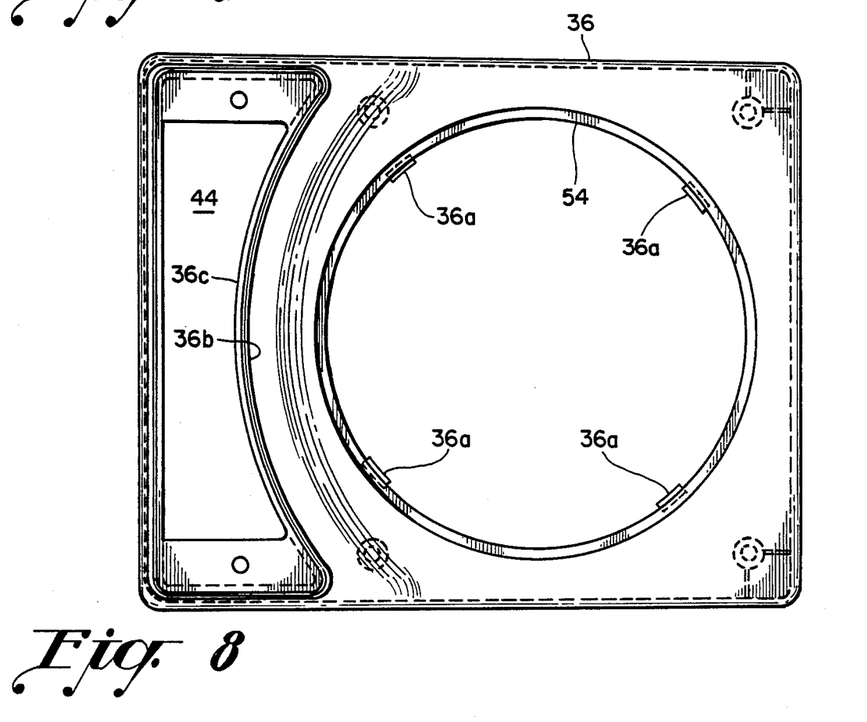
FIG. 8 is a top plan view of the column and pedestal portion of the coffeemaker of FIG. 1.

In order to rigidly secure the column and pedestal member 36 to the head member 38, the member 36 is formed with a shouldered portion 36b which surrounds an upstanding flange 36c which extends into a skirt portion 38r extending downwardly from the head member 38. To complete the assembly of the members 36 and 38, ther are assembly screws 104 which extend upwardly through openings in the member 36 into internally threaded bosses 105 in the head member 38, as is best shown in FIGS. 3, 8 and 12.

Figure 6:
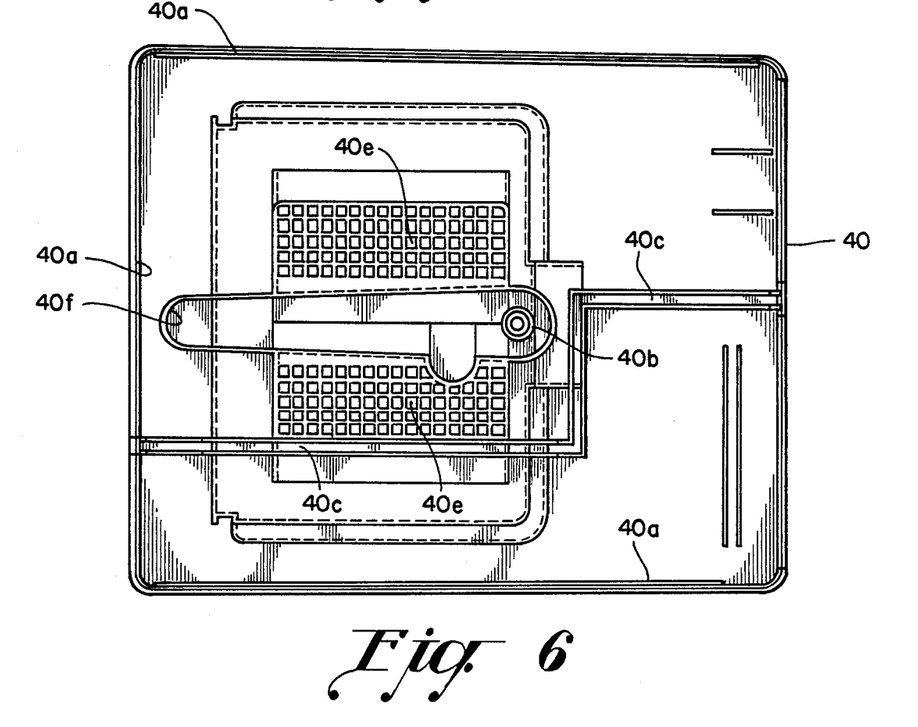
FIG. 6 is a bottom plan view of the cover of the coffeemaker of FIG. 1.

The cover 40 is received on the top of the head member 38 having locating walls 40a which extend inside of the side walls 38c and 38d and inside of the rear wall 38b to properly position the cover 40 with respect to the head 38. The assembly screw 88 extends upwardly into threaded engagement with a depending boss 40b, as shown in FIGS. 3 and 4. As is best shown in FIG. 6, which is the bottom view of the cover 40, there is provided a pair of walls defining a groove or slot 40c within which the top edge of the wall 38g is received. By having the wall 38c received in the slot 40c in the cover, it is assured that there will be no splashing or leaking of water from the reservoir 80 over into the compartment 84 within which the electrical connections are made to the clock or control module 52.

In order to permit water to be poured into the reservoir 80, the cover is provided with a depressed area 40d within which are located two screened openings 40e. The screens across the openings 40e are formed by an integrally molded lattice work of criss-crossed bars leaving openings which are approximately an eighth of an inch square in the constructed embodiment of the invention. Between the two openings 40e there is a continuous elongated wall portion 40f which surrounds the top of wall 38j which define the trough 82. The walls 40f and the portion of the cover 40 therebetween forms a closure for the top of the trough 82, thereby preventing any water from entering the trough 82 through the openings 40e as one is filling the reservoir 80.

A lid 106 is provided on the cover 40 to close the openings 40e during the coffee brewing period and whenever the reservoir 80 is not being filled. The lid 106 rests within the recess 40d and has an aligned pair of outwardly extending pins 108 which engage recesses 110 in the cover 40 to support the lid 104 for pivotal movement from the horizontal position within the recess portion 40d to a vertical position in which the lid is out of obstructing relationship with respect to the openings 40e.

From the foregoing description it should be appreciated that the coffeemaker 20 embodying the instant invention is simple in design, having a relatively few number of parts and making use of the head portion of the housing to perform multiple functions in storing and transferring the water to the dispensing head. The novel means for maintaining the vapors generated during the coffee brewing process within the system are simple and add little to the cost of the coffeemaker. The skirt 96 is readily deformed to permit insertion and removal of the carafe assembly with respect to the housing of the coffeemaker and, therefore, causes little or no interference with the operation and use of the unit. At the same time, the flexible skirt engages in a positive manner to seal against the funnel portion of the spreader plate to assure against the egress of vapors.

What is claimed as new and desired to be secured by Letters Patent of the United States is:

1. A drip type coffeemaker comprising a housing having a pedestal portion for receiving a coffee carafe and a column supporting a liquid dispensing head portion, a coffee carafe having an upwardly facing mouth, said carafe supporting at said mouth a coffee ground receiving basket with a cover, said cover being formed with at least one opening through which water may pass to said coffee grounds, said carafe with said basket being received on said pedestal portion below said dispensing head, a flexible skirt having an upper edge secured in sealed engagement with said head portion and depending from said head portion to form a conduit between said head portion and said basket enclosing said liquid dispensing head and said opening in said cover, said skirt having generally cylindrical side walls and being mounted with the axis disposed vertically, said cover comprising a spreader plate having an annular horizontal surface which surrounds a depressed portion in which there are disposed a plurality of apertures, said spreader plate being formed with said depressed portion connected to said annular surface by a funnel portion, said lower edge of said skirt engaging said funnel portion when said carafe with said basket and spreader plate are received on said pedestal portion to form a sealed conduit between said carafe and said head portion, said cylindrical side walls flexing when said carafe is moved into and out of position on said pedestal portion to disengage said lower edge from said funnel portion.

2. A drip type coffeemaker comprising a housing having a pedestal portion for receiving a coffee carafe and a column supporting a liquid dispensing head portion, a coffee carafe having an upwardly facing mouth, said carafe supporting at said mouth a coffee ground receiving basket and a liquid spreader plate, said spreader plate being formed with a plurality of apertures through which water may pass to said coffee grounds, said carafe with said basket being received on said pedestal portion below said dispensing head, a flexible skirt having an upper edge secured in sealed engagement with said head portion and depending from said head portin to form a conduit between said head portion and said spreader plate enclosing said liquid dispensing head and said apertures in said spreader plate, said skirt having a lower edge which may be engaged and disengaged from contact with said spreader plate when said carafe is moved into and out of position on said pedestal portion below said dispensing head, said spreader plate including a depressed portion in which said apertures are disposed, said depressed portion being surrounded by a funnel portion of said spreader plate, said lower edge of said skirt engaging said funnel portion when said carafe with said basket and spreader plate are received on said pedestal portion to form a sealed conduit between said carafe and said head portion, said skirt including a portion within said funnel portion which is beveled inwardly and said lower edge of said skirt having an enlarged bead to provide increased rigidity at said lower edge and to provide a seal betwen said ring and said funnel portion of said spreader plate.

3. A drip type coffeemaker comprising a housing having a pedestal portion for receiving a coffee carafe and a column supporting a liquid dispensing head portion, a water reservoir received in said head portion, heating means in said pedestal portion for heating water from said reservoir, conduit means extending from said reservoir to said heating means and from said heating means to a liquid dispensing head in said portion, a coffee carafe having an upwardly facing mouth, said carafe supporting at said mouth a coffee ground receiving basket with a liquid spreader plate, said spreader plate being formed with a plurality of apertures through which water may pass to said coffee grounds, said carafe with said basket being received on said pedestal portion below said dispensing head, a flexible skirt depending from said head portion to form a conduit between said head portion and said spreader plate enclosing said liquid dispensing head and said spreader plate, an opening in said head portion communicating between said conduit and said reservoir to conduct water vapor from said conduit into said reservoir.

4. The combination of claim 3 wherein said flexible skirt comprises a ring of flexible material having generally cylindrically disposed walls and having a vertical axis which is coincident with said liquid dispensing head.

5. The combination of claim 4 wherein said spreader plate includes an annular horizontal surface which surrounds a depressed portion in which said apertures are disposed, said depressed portion being connected to said annular surface by a funnel portion of said spreader plate, said skirt engaging said funnel portion when said carafe with said basket and spreader plate are received on said pedestal portion.

6. The combination of claim 5 wherein said portion of said ring within said funnel portion being beveled inwardly and at its lowermost edge having an enlarged bead to provide increased rigidity at said lower edge and to provide a seal between said ring and said funnel portion of said spreader plate.

7. The combination of claim 3 wherein said head of said housing having said reservoir defined by bottom and side walls, said head portion having an upwardly facing trough disposed adjacent to said reservoir, a vertically extending passageway at an end of said trough, said passageway having a lower end connected by said conduit means to said heating means, said passageway terminating below the top of said trough to provide discharge of heated water into said trough, an opening formed at the bottom of said trough to permit flow of heated water to said dispensing head, a second passageway defined in part by said trough extending from said opening in said head portion to conduct water vapor from said depressed portion of said spreader plate to the top of said trough and said reservoir.

8. A drip type coffeemaker comprising a hous having a pedestal portion for receiving a coffee carafe and a column supporting a liquid dispensing head portion, a water reservoir received in said head portion, heating means for heating water from said reservoir, first conduit means extending from said reservoir to said heating means and second conduit means extending from said heating means to a liquid dispensing head in said head portion, a coffee carafe having an upwardly facing mouth, said carafe supporting at said mouth a coffee ground receiving basket, said head portion including a molded plastic member with bottom and side walls forming said water reservoir, an opening being formed in the bottom of said reservoir communicating with said first conduit, said molded plastic member including integral walls defining a passageway which is a part of said second conduit means and which conducts water from the bottom of said head portion through said head portion to a height above the maximum level to which said reservoir may be filled and downwardly to said dispensing head in said bottom of said head portion.

9. The combination of claim 8 wherein said passageway is formed by a trough within said reservoir, said trough having a first end provided with a dam which separates the water incoming from said heating means from the remainder of said trough, said dam having a top which is above the maximum level to which said reservoir may be filled, a discharge opening at the bottom of said trough at an end remote from said first end, said discharge opening communicating with said dispensing head.

10. The combination of claim 9 including a flexible skirt depending from said head portion to form a conduit between said head portion and said spreader plate enclosing said liquid dispensing head and said apertures in said spreader plate, a passageway formed in said molded member extending from the portion of said head portion within said skirt to the top of said trough to vent vapor from above said spreader plate to said trough.

11. The combination of claim 10 wherein the top of one of the walls defining said trough is formed with an opening to vent vapors from said trough into said reservoir.

12. The combination of claim 9 wherein said head portion includes a cover secured to said molded member in engagement with said reservoir and said trough walls to separate said reservoir from said passageway.

13. A drip type coffeemaker comprising a housing having a pedestal portion for receiving a coffee carafe and a column supporting a liquid dispensing head portion, a water reservoir received in said head portion, heating means in said pedestal portion for heating water from said reservoir, first conduit means extending from said reservoir to said heating means and second conduit means extending from said heating means to a liquid dispensing head in said head portion, a coffee carafe having an upwardly facing mouth, said carafe supporting at said mouth a coffee ground receiving basket and a liquid spreader plate, said spreader plate being formed with a plurality of apertures through which water may pass to said coffee grounds, said head portion including a molded plastic member formed with bottom and side walls to provide said water reservoir, an opening being formed in the bottom of said reservoir communicating with said first conduit, means to permit water to flow from said reservoir to said heating means, said molded plastic member including passageway forming a part of said second conduit means for transferring water through said head portion to a height above the fill level for said reservoir and downwardly to said dispensing head in said bottom of said head portion.

14. The combination of claim 13 wherein said head portion includes a chamber formed by said molded plastic member adjacent to said reservoir but separate therefrom, said chamber having side and bottom walls formed by said member including one common wall with said water reservoir, said head portion including a front opening into said chamber, a control module received in and closing said front opening, said head portion including a cover secured to said molded member in engagement with said reservoir and said chamber, side walls and said control module to seal said chamber from the water contained in said reservoir.

15. The combination of claim 14 wherein said cover includes fill opening communicating with said reservoir, and a hinged lid for closing said fill openings.

16. The combination of claim 13 wherein said passageway is formed by a trough within said reservoir, said trough being defined by vertical walls which are generally parallel to and coextensive with the side walls of said reservoir, one end of said trough being provided with a dam which separates the incoming water from said heating means from the remainder of said trough, said dam having a top which is above the fill level of said reservoir, a discharge opening at the bottom of said trough at the end remote from said dam, said discharge opening communicating with said dispensing head.

17. The combination of claim 16 including a flexible skirt depending from said head portion to form a conduit between said head portion and said spreader plate enclosing said liquid dispensing head and said apertures in said spreader plate, a passageway formed in said molded member extending from the portion of said head portion within said skirt to the top of said trough to vent vapor from above said spreader plate said trough.

18. The combination of claim 17 wherein the top of one of the walls defining said trough is formed with an opening to vent vapors from said trough into said reservoir.

19. The combination of claim 17 wherein said head portion includes a cover secured to said molded member in engagement with said reservoir and said trough walls to separate said reservoir from said passageway.

20. A drip type electric coffeemaker comprising a housing having a pedestal portion for receiving a coffee carafe and a column supporting a liquid dispensing head portion, heating means in said pedestal portion, said pedestal portion and said column comprising a molded plastic member having a circular opening positioned under said head portion, said member being formed with a peripheral flange around said opening forming a ledge for supporting a heater assembly, integrally formed lugs on said member engaging with portions of said heater assembly to lock said heater assembly against said ledge in assembled relation to said housing.

21. The combination of claim 20 wherein said heater assembly comprises a support ring having inner and outer edges and which engages said ledge at its outer edge and a heat transfer disc at its inner edge, a sheathed heating element supported by said ring in good heat transfer relation with said disc, a bracket carried by said ring urging said element against said disc, said lug engaging portions of said heater assembly comprising integrally formed projections on said ring.

22. The combination of claim 21 wherein said ring includes further integrally formed projections which have openings in which said bracket is received to clamp said heating element against said disc and to urge said disc against the underside of said ring.

* * * * *